Dec. 18, 1956   J. S. B. WRIGHT   2,774,159
DISPLAY DEVICES
Filed July 18, 1952
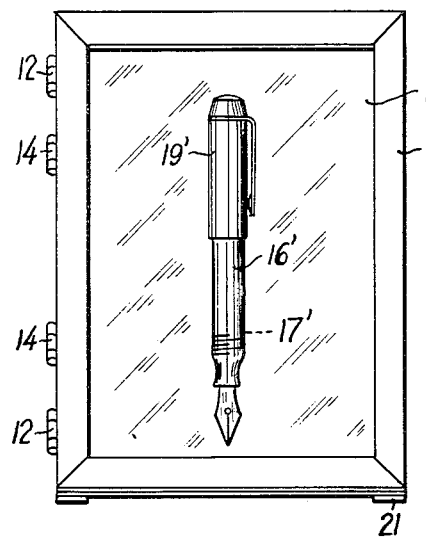
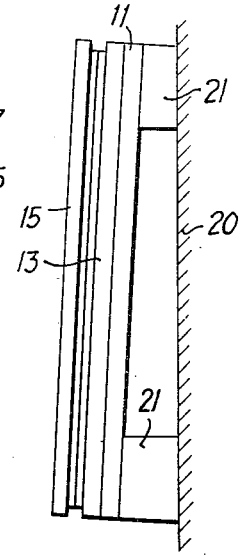
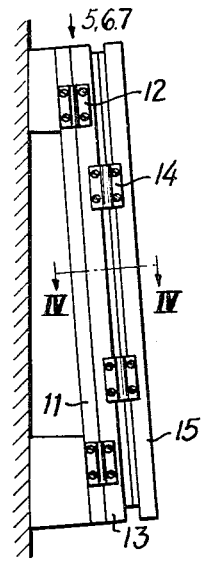
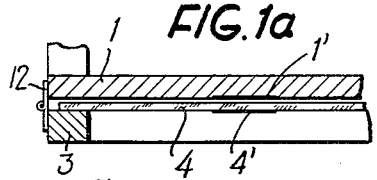
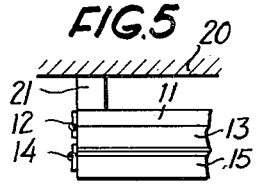
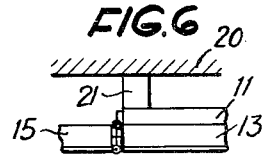
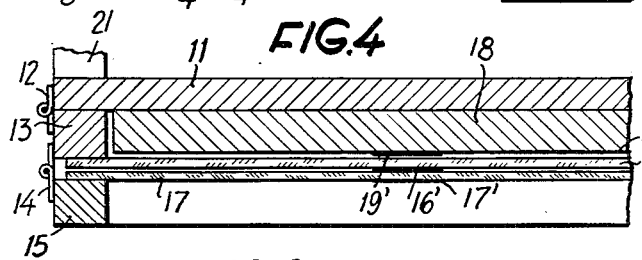
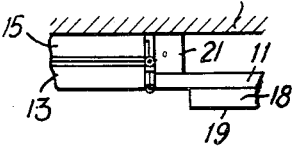
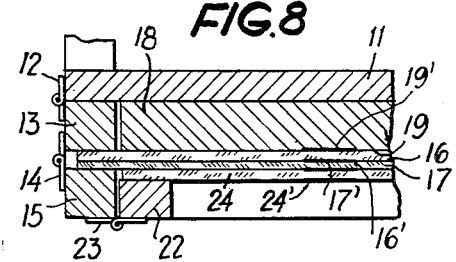
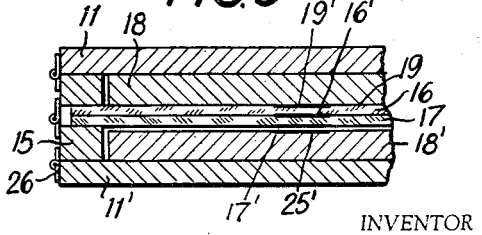
INVENTOR
John Stewart Bell Wright
BY Young, Emery & Thompson
ATTORNEYS United States Patent Office 2,774,159
Patented Dec. 18, 1956

2,774,159
DISPLAY DEVICES

John Stewart Bell Wright, London, England, assignor to Transart Aktiebolag, Gothenburg, Sweden, a corporation of Sweden Application July 18, 1952, Serial No. 299,670

Claims priority, application Great Britain July 21, 1951

4 Claims. (Cl. 40—102)

The invention relates to a display device of the kind which incorporates one or more transparent leaves bearing opaque representations, the leaves being used, for example, to provide a cumulative representation, when they are superimposed in registration on an underlying element, of the complete representation. Such display devices, and the leaves for use with them are disclosed in British specifications Nos. 457,696, 499,281, 506,447 and 532,612.

The object of the invention is a display device, of the kind set forth, which is particularly adapted for use with the planes of the transparent sheets arranged to be vertical or substantially so.

A further object of the invention is to utilize flexible transparent sheets as carrying means for the elements of a composite representation in a display device of the kind referred to.

A still further object is to provide a display device in which transparent sheets each carrying an element of a composite representation such as a pictorial representation are adapted to lie flatly in contact with one another and, as a unit, with a coacting element on a support whereby to avoid any distortion due to parallax.

Further objects of the invention will be apparent from the following description of embodiments of the invention illustrated by way of example in the accompanying drawing in which Fig. 1 is a front view of the device in folded condition, Fig. 1a is a horizontal section of a simplified embodiment with only one transparent sheet.

Figs. 2–7 illustrate an embodiment of the invention incorporating two transparent sheets in respective hinged frames, wherein Fig. 2 is a view from the right-hand side of Fig. 1 and showing the device in a preferred position, Fig. 3 is a view from the left-hand side of Fig. 1 and showing the device in the same preferred position as Fig. 2, Fig. 4 is a section, to an enlarged scale, on the line IV—IV of Fig. 3, of a portion of the device adjacent the hinges, Figs. 5, 6 and 7 are plan views corresponding with Fig. 4, but to the same scale as Figures 1 to 3, showing how the frames can be moved for modifying the representation to be depicted, Fig. 8 is a section similar to Fig. 4 but showing an embodiment with three transparent sheets, and Fig. 9 also is a section similar to Fig. 4 and showing a further embodiment with a cover.

In the drawing Fig. 1a illustrates the simplest embodiment of the invention in which there is only one transparent sheet. The support is denoted with 1, hinges with 12 and a frame connected to the support at one of its edges by the hinges 12 with 3. The transparent sheet 4 which may be of flexible material, is attached to the surface of the frame 3 which will lie flat on the support when an element 1' of a composite pictorial representation located on the support is superimposed in register with a corresponding element 4' of the composite pictorial representation carried by the transparent sheet 4.

Alternatively the sheet could be held by its frame to be spaced from the said surface of the support, and in that case the said coacting element of the representation can be on a raised portion of the support, fitting within the frame, so as to be contacted by the transparent sheet when the latter is in the superimposed position.

Where two of the flexible transparent sheets in frames are to be superimposed on the said coacting element, the latter may, as before, be on a raised portion of the support, and the adjacent transparent sheet may be affixed to the remote side of its frame, the latter being of a size that will admit the raised portion and of a thickness equal to the height of the raised portion. The second transparent sheet may be on the side of its frame which, in folded condition, is adjacent the frame of the first transparent sheet. Alternatively the second transparent sheet can be on the remote side of its frame, and the opening in the latter be of a size to receive the frame of the first transparent sheet. In either of these ways both transparent sheets and the said coacting element are maintained flatly in contact in the superimposed position.

If it should be desired to add a third transparent sheet for superimposition on the two in the example last described, the third transparent sheet can be mounted on the side of its frame which is adjacent the frame of the second transparent sheet whereby to lie flatly in contact with the latter in the superimposed position.

Obviously a fourth transparent sheet could be made fast with the side, adjacent the third transparent sheet, of a frame adapted to be received within the latter.

The transparent sheets can be supported from their frames by any suitable means (e. g., by adhesives or clips), and the positions of their hinges are such that the transparent sheets can be moved into the superimposed position with their surfaces flatly in contact with each other, the position of the hinges also preferably being such that when the transparent sheets are folded away from the coacting element of the representation they themselves (with or without another coacting element of a representation on another part of the support) give a cumulative representation of an object depicted, but from the other side.

The device shown in Figs. 1 and 2–7 includes also a rigid support 11 to which is connected, by hinges 12, 12, a first frame 13, and the latter has hinged to it at 14, 14 a second frame 15, the hinges 12, 12 and 14, 14 being at the same edge of the device.

As shown (see, particularly Figure 4) there is a transparent sheet 16 fast with the remote side of the frame 13, and the frame 15 also carries a transparent sheet 17 on the side adjacent the frame 13 when both are folded. The support 11 has a raised portion 18 which is fast therewith and extends into the frame 13 for a picture component 19' on its surface 19, when the frames are folded, to make flat contact with the sheet 16, which latter makes flat contact with the sheet 17. The sheets 16 and 17 bear opaque picture components 16', 17' which, when the frames are folded as shown in Figure 4, are superimposed on the picture component on the surface 19. Thus the picture component on the sheet 17 can be an outside view of an object, the one on the sheet 16 can be an internal section of the object and the one on the surface 19 can be a still further internal section of the object. Said object being shown as a pencil in Fig. 1.

Figures 5 to 7 show how the object depicted can be pictorially illustrated either externally or internally. Thus Figure 5 shows the frames in their folded condition in which an exterior view of the object is depicted, while in Figure 6 the frame 15 has been hinged to an open position, for an edge to abut the adjacent edge of the frame 13, and thus discloses the internal section depicted on sheet 16 superimposed on the section shown on the surface 19. In Figure 7 both frames are shown hinged to their open position whereby to disclose the section of the object depicted on the surface 19. The transparent sheets 16, 17 can, in known manner, bear reverse views of the object, so that in Figure 6 the transparent sheet 17 exhibits an inside view of the portion of the object which was removed when the frame 15 was swung open. Similarly, in the position shown in Figure 7, an inside view of the portion of the object which was removed by the swinging open of frame 13 could be shown on the back of the transparent sheet 16, which latter, together with the inside of the transparent sheet 17 can give a composite picture. Thus, in use, the device can be used for the pictorial assembling and dismantling of an object from two opposite sides.

Fig. 8 illustrates a modified embodiment having three transparent sheets. Two of the sheets are arranged similar to sheets 16 and 17 in Fig. 4, and the modified embodiment differs from that shown in Fig. 4 only by the addition of a further frame 22 connected to frame 15 by hinges 23 and fitting within frame 15. The flexible transparent sheet 24 is attached peripherally to the side of the frame 22 facing sheet 17 so as to lie in flat contact with the latter sheet when the frames are folded as shown in Fig. 8, an element 24' of the composite representation registering with the elements 19', 16', 17' on the raised portion 18 and on the transparent sheets 16, 17 respectively.

The device may be completed with a cover, preferably of the same construction as the support 11 and having a raised portion similar to that of the support but extending into the outermost frame, the cover being hinged to said frame and bearing an element of the composite representation. Such an embodiment is illustrated in Fig. 9, wherein 11' is the cover and 18' the raised portion fitting within the outermost frame 15 and bearing an element 25' of the composite representation, the other elements 19', 16', 17' of which are located on the raised portion of the support 11 and on the transparent sheets 16, 17, respectively. The cover 11' is connected, at one of its edges, with the frame 15 by hinges 26 whereby it may be swung away from the transparent sheet 17 to uncover the cumulative representation formed by the elements 17', 16' and 19'.

In order to ensure that the frames when swung open, and also when folded, should move to a position in which registration of the images on the transparent sheets is obtained, it is preferred for the device to be supported, for example, from a wall 20 by four blocks 21 arranged behind its corners, the blocks being tapered so as to cause the frames to move to the desired position under the influence of gravity.

What I claim is:

1. A display device comprising a pair of rigid frames, means for hinging said frames at one side thereof for swinging movement to cause said frames to be juxtaposed, a thin flexible transparent sheet attached peripherally to each of said frames at the side surfaces adjacent to each other, each sheet bearing an element of a composite representation, a third rigid frame of smaller dimension than the other frames adapted to be nested within one of the first mentioned frames, a thin flexible transparent sheet bearing a further element of a composite representation attached peripherally to said third frame, and means for hinging the third frame to the frame within which it is nested with its transparent sheet in flat contact with the transparent sheet of the last mentioned frame.

2. A display device comprising a rigid support bearing an element of a composite representation, means mounting the support in a position slightly inclined to the vertical on a vertical surface, a plurality of transparent sheets each bearing further elements of the composite representation, each transparent sheet being carried by a peripheral rigid frame of an essentially greater thickness than that of its sheet, means to hinge one of said transparent sheets at one edge to the support and means to hinge the second transparent sheet at the same edge to the first, said hinge means being located so as to cause the support and frames to project into one another and to cause registration of the elements of the support and the transparent sheets in a superimposed position of the support and the transparent sheets.

3. A display device comprising a rigid support, a raised portion of the support bearing an element of a composite representation, means mounting the support in a position slightly inclined to the vertical on a vertical surface, a rigid frame hinged to said support at one edge, a transparent sheet attached peripherally to said frame at the side thereof remote from the support and bearing a further element of the composite representation, said raised portion fitting within the frame to be contacted by the transparent sheet in a registered position of the elements of the composite representation, a further rigid frame hinged to the first frame and a further transparent sheet attached peripherally to said second rigid frame at the side thereof adjacent to the first transparent sheet, said further transparent sheet carrying a further element of the composite representation in a position to register with the other elements to form the composite representation with the transparent sheets in flat contact with one another.

4. A display device comprising a rigid support bearing an element of a composite representation, means mounting the support in a position slightly inclined to the vertical on a vertical surface, a plurality of rigid frames, a transparent thin flexible sheet secured peripherally to each frame, said sheets each carrying a further element of the composite representation and being in close contact with each other, means to hinge a first of said frames to the support with its transparent sheet in contact with said support and with the element of the composite representation, a second of said frames closely fitting within the first frame, and means to hinge said second frame to said first frame with its transparent sheet in flat contact with the transparent sheet of the first frame in a folded position of the frames.

References Cited in the file of this patent

UNITED STATES PATENTS

| | | |
|---|---|---|
| 153,283 | Shatto | July 21, 1874 |
| 328,161 | Watson | Oct. 13, 1885 |
| 356,520 | Adams | Jan. 25, 1887 |
| 1,190,069 | Abenarthy | July 4, 1916 |
| 1,342,477 | Walas | June 8, 1920 |
| 1,752,428 | Farver | Apr. 1, 1930 |
| 1,852,000 | Blue | Apr. 5, 1932 |
| 1,883,834 | Turner | Oct. 18, 1932 |
| 2,091,260 | Farkas | Aug. 31, 1937 |
| 2,149,779 | Kroner | Mar. 7, 1939 |
| 2,151,055 | Stark | Mar. 21, 1939 |
| 2,311,946 | Kroner | Feb. 23, 1943 |
| 2,556,798 | Concordet | June 12, 1951 |